April 4, 1961 W. FISHER 2,978,282
STAMPED RETAINER FOR ROLLER THRUST BEARINGS
Filed Dec. 10, 1956

INVENTOR
WALTER FISHER

BY Mason, Porter, Miller & Stewart
ATTORNEYS

United States Patent Office 2,978,282
Patented Apr. 4, 1961

2,978,282
STAMPED RETAINER FOR ROLLER THRUST BEARINGS
Walter Fisher, South Bend, Ind., assignor, by mesne assignments, to The Torrington Company, Torrington, Conn., a corporation of Maine Filed Dec. 10, 1956, Ser. No. 627,386
1 Claim. (Cl. 308—235)

The following description relates to a stamped metal retainer for roller thrust bearings commonly used at the end of a shaft or the like.

Bearings of this type require means for supporting rollers radially spaced in a transverse plane. The rollers must be free to rotate but constrained to extend in radial lines and protected against centrifugal movement. This has ordinarily been accomplished by providing metal disks only slightly less thick than the diameter of the rollers with provision in the individual pockets to withstand the centrifugal tendency of the rollers.

It is an object of my invention to provide a rigid retainer and spacer or cage for roller thrust bearings of thin sheet metal parts held in rigid parallelism.

A further object of the invention is to provide means to withstand the tendency of the rollers to move centrifugally.

Among the objects of my invention is to provide such a sheet metal cage with means to resist the wear of the rotating rollers both radially and tangentially.

A still further object of the invention is to locate the wear resisting member between the sheet metal parts and on the longitudinal axis of the rollers, so that there shall be a minimum frictional engagement with the rollers.

Other objects of the invention will be evident from the specific and preferred form of the invention shown in the accompanying drawings in which.

Figure 1:
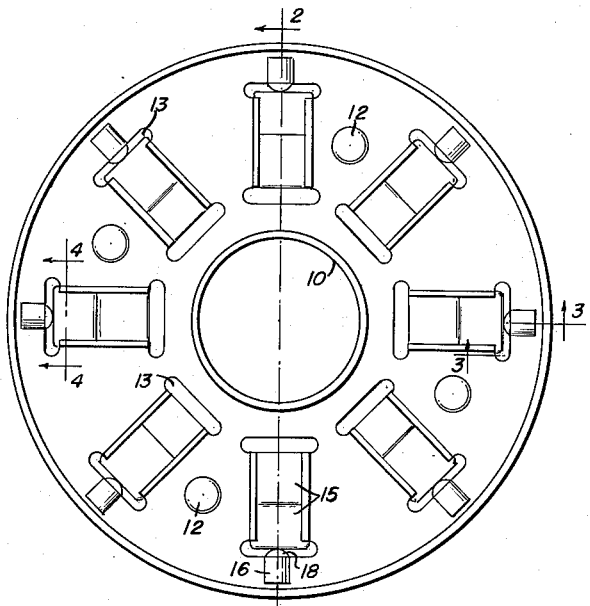
Fig. 1 is a front view of the improved roller thrust bearing assembly.

By way of example I have shown a cage or retainer and spacer for roller thrust bearings formed from thin sheet metal parts rigidly fastened together to maintain the cage fiat or planar. In this way material reduction in the weight of the cage is effected and economy in manufacture obtained.

The use of complementary sheet metal parts makes it possible to provide flanges which hold the rollers in proper radial position, but free to move independently. At the same time the outer roller of each unit is supported against radial or centrifugal movement by a special hardened stud which is held in a common recess formed between the complementary sheet metal parts.

Referring to the drawings I have shown two complementary stamped sheet metal plates 8 and 9. Each plate has a circular internal flange 10 and an external flange 11. Each member 8 and 9 is thus a dished plate in which the flanges serve to reinforce the structure and preserve its flatness.

The plates are held together by means of appropriate fastenings 12. These fastenings may consist of round-head rivets, rivets of the expanding type, or autogenous welding between the contacting surfaces.

A convenient number of radially disposed pockets 13 are provided in the individual plates by stamping or other convenient operation. In the form shown, the pockets are produced by striking up lips 14 from the metal of the plates. Each plate has a pair of lips 14 which diverge from the common plane or in other words, extend in the same direction as the flanges 10 and 11.

Pockets 13 have suitable length to accommodate rollers 15. These rollers may be one or any suitable number in each pocket to permit independent rotation without strain.

Figure 2:
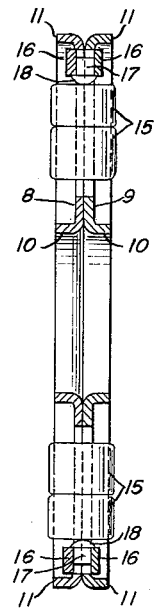
Fig. 2 is a transverse cross-section on the line 2—2 of Fig. 1.
Figure 3:
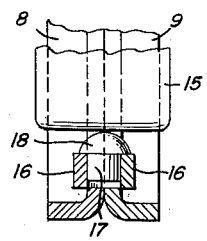
Fig. 3 is an enlarged transverse cross-section on the line 3—3 of Fig. 1.
Figure 4:
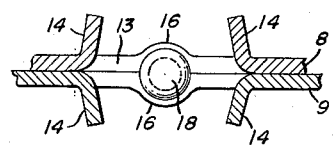
Fig. 4 is an enlarged fragmentary cross-section of a retainer on the line 4—4 of Fig. 1 showing a roller pocket.
Figure 5:
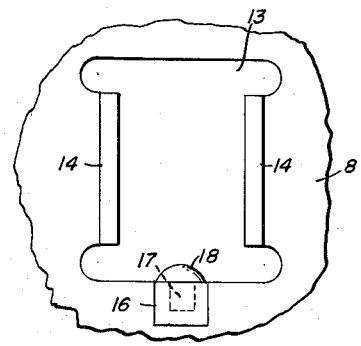
Fig. 5 is an enlarged front view of a portion of the retainer showing a roller pocket and Fig. 6 is an enlarged front view of a modified form of roller pocket.

It will be understood that the rollers have a diameter slightly greater than the combined thickness of the complementary plates 8 and 9. This is shown in Figs. 2, 3 and 4. It provides for suitable contact between the rollers and adjacent flat thrust blocks, not shown on the drawings.

Means are provided at the outer end of each pocket 13 to withstand the centrifugal tendency of the rollers and to minimize friction between them and the retainer.

In the form shown in Figs. 1 to 5 inclusive, the metal of the plates 8 and 9 has been struck up out of the common plane to form semicircular collar portions 16, 16. The portion 16 of one plate will cooperate with the similar portion of the other plate to form a recessed collar.

The recessed collar forms a seat for a short stud 17 which is held by frictional engagement with the formed collar portions 16, 16. There is enough resilience in the portion 16 to assure a tight grip on the stud 17 and prevent its inadvertent removal.

The stud 17 has a hardened knob or head 18. As shown more particularly in Figs. 1, 2 and 3, this knob 18 is in the plane between the two plates 8 and 9 and along the longitudinal axis of the pocket 13. As a result the center of the roller 15 rests against the knob 18 with a minimum of frictional engagement.

Figure 6:
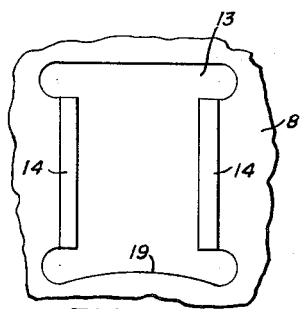

A similar advantage will be found in the form illustrated in Fig. 6, where an abutment 19 is formed in the stamping of the pocket 13. This abutment 19 is provided in both plates 8 and 9, so that the arched contour or convexity is opposite the longitudinal axis of the roller 15.

By the arrangement thus described, a retainer or cage for roller thrust bearings has been devised out of stamped thin sheet metal, preserving however the utmost in stiffness and flatness. The formation of the collars at the outer ends of the pockets permits a most advantageous seat for the studs 17 with the knobs 18 withstanding the centrifugal effect of the rollers 15. At the same time a minimum of frictional wear results.

While the preferred form of the invention has been illustrated by way of example, it is to be understood that minor changes in arrangement, parts and material may be made without departing from the scope of the invention as defined in the following claim.

What I claim is:

A retainer for roller thrust bearings comprising a pair of complementary thin metal plates fastened together and having uniformly spaced radial roller-receiving pockets, the outer edges of the pockets in each plate being convex to form a single wear-resisting abutment for the end of the roller in the pocket.

References Cited in the file of this patent

UNITED STATES PATENTS

| | | |
|---|---|---|
| 718,111 | Eveland | Jan. 13, 1903 |
| 1,169,150 | Heim | Jan. 25, 1916 |
| 1,246,001 | Fox et al. | Nov. 6, 1917 |
| 1,334,265 | Simmons | Mar. 16, 1920 |
| 1,734,222 | Marles | Nov. 5, 1929 |
| 2,117,633 | Smith | May 17, 1938 |
| 2,724,625 | White | Nov. 22, 1955 |